(12) United States Patent
Mayhew (10) Patent No.: US 8,930,595 B2
(45) Date of Patent: Jan. 6, 2015

(54) MEMORY SWITCH FOR INTERCONNECTING SERVER NODES

(75) Inventor: David E. Mayhew, Northborough, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 103 days.

(21) Appl. No.: 13/529,452

(22) Filed: Jun. 21, 2012

(65) Prior Publication Data

US 2013/0346645 A1 Dec. 26, 2013

(51) Int. Cl.
*G06F 3/00* (2006.01)
*G06F 5/00* (2006.01)
*G06F 12/00* (2006.01)

(52) U.S. Cl.
USPC .................. 710/52; 710/2; 710/38; 711/149

(58) Field of Classification Search
None
See application file for complete search history.

(56) References Cited

U.S. PATENT DOCUMENTS

| 5,790,541 | A | 8/1998 | Patrick et al. |
|---|---|---|---|
| 6,510,161 | B2 | 1/2003 | Trevitt et al. |
| 6,785,892 | B1 | 8/2004 | Miller et al. |
| 6,795,886 | B1 | 9/2004 | Nguyen |
| 6,823,453 | B1 | 11/2004 | Hagerman |
| 6,850,987 | B1 | 2/2005 | McCanne et al. |
| 7,421,532 | B2 | 9/2008 | Stewart et al. |
| 7,480,303 | B1 | 1/2009 | Ngai |
| 7,502,840 | B1 | 3/2009 | Bakke |
| 7,568,074 | B1 | 7/2009 | Kavipurapu et al. |
| 7,814,259 | B2 | 10/2010 | Stewart et al. |
| 7,913,019 | B2 | 3/2011 | Inagawa et al. |
| 7,913,027 | B2 | 3/2011 | Kloeppner et al. |
| 7,925,802 | B2 | 4/2011 | Lauterbach et al. |
| 2002/0069318 | A1* | 6/2002 | Chow et al. ................... 711/104 |
| 2002/0087751 | A1* | 7/2002 | Chong, Jr. ....................... 710/33 |
| 2003/0123468 | A1 | 7/2003 | Nong |
| 2004/0258062 | A1 | 12/2004 | Narvaez |
| 2005/0117578 | A1 | 6/2005 | Stewart et al. |
| 2006/0282547 | A1 | 12/2006 | Hasha et al. |
| 2007/0162572 | A1 | 7/2007 | Aloni et al. |
| 2007/0283128 | A1 | 12/2007 | Hoshaku |

(Continued)

FOREIGN PATENT DOCUMENTS

EP 0581486 2/1994

OTHER PUBLICATIONS

Whelihan, David et al.; "Memory Optimization in Single Chip Network Switch Fabrics"; Department of Electrical Engineering; Carnegie Mellon University, Pittsburgh, PA; Jun. 10-14, 2002; 6 pages.

(Continued)

*Primary Examiner* — Kris Rhu
(74) *Attorney, Agent, or Firm* — Park, Vaughan, Fleming & Dowler, LLP (57) ABSTRACT

Described is a data switching device comprising a plurality of input ports, a plurality of output ports, a plurality of first conductive connectors, a plurality of second conductive connectors, a plurality of crosspoint regions, and a memory device at each crosspoint region. The first conductive connectors are in communication with the input ports. The second conductive connectors are in communication with the output ports. Each crosspoint region includes a first conductive connector and a second conductive connector. The memory device is coupled between the first conductive connector and the second conductive connector for exchanging data between the input ports and the output ports.

5 Claims, 7 Drawing Sheets

(56) References Cited

U.S. PATENT DOCUMENTS

| | | | |
|---|---|---|---|
| 2008/0005624 | A1 | 1/2008 | Kakivaya et al. |
| 2008/0028467 | A1 | 1/2008 | Kommareddy et al. |
| 2008/0320181 | A1 | 12/2008 | Lauterbach et al. |
| 2009/0070405 | A1 | 3/2009 | Mazzaferri |
| 2009/0175276 | A1 | 7/2009 | Tsuge et al. |
| 2009/0216920 | A1 | 8/2009 | Lauterbach et al. |
| 2009/0292813 | A1 | 11/2009 | Snively et al. |
| 2009/0323710 | A1* | 12/2009 | Shahar et al. ............... 370/412 |
| 2010/0142560 | A1 | 6/2010 | Sharivker et al. |
| 2010/0172172 | A1* | 7/2010 | Kim et al. .................. 365/148 |
| 2010/0241722 | A1 | 9/2010 | Seminaro et al. |
| 2010/0250717 | A1 | 9/2010 | Akagi |
| 2010/0272117 | A1* | 10/2010 | Wu et al. .................... 370/413 |
| 2011/0072204 | A1 | 3/2011 | Chang et al. |
| 2011/0103245 | A1 | 5/2011 | Lu |
| 2011/0202701 | A1 | 8/2011 | Maitra |
| 2012/0033672 | A1 | 2/2012 | Page et al. |
| 2012/0243542 | A1 | 9/2012 | Sugumar et al. |
| 2012/0284712 | A1 | 11/2012 | Nimmagadda et al. |
| 2012/0291028 | A1 | 11/2012 | Kidambi et al. |
| 2012/0331065 | A1 | 12/2012 | Aho et al. |
| 2013/0258899 | A1 | 10/2013 | Anantharam et al. |

OTHER PUBLICATIONS

Hummel et al; Patent Application for "Server Node Interconnect Devices and Methods"; U.S. Appl. No. 13/470,847, filed May 14, 2012.

Mayhew et al.; Patent Application for "Devices and Methods for Interconnecting Server Nodes"; U.S. Appl. No. 13/526,973, filed Jun. 19, 2012.

Non-Final Office Action in related U.S. Appl. No. 13/675,401, mailed on Jan. 2, 2014; 20 pages.

International Search Report & Written Opinion for related international patent application No. PCT/US13/69572, mailed on Feb. 20, 2014; 14 pages.

Non-Final Office Action in related U.S. Appl. No. 13/602,512, mailed on Mar. 11, 2014; 18 pages.

Non-Final Office Action in related U.S. Appl. No. 13/526,973, mailed on Mar. 17, 2014; 8 pages.

Mayhew et al., "PCI Express and Advanced Switching: Evolutionary Path to Building Next Generation Interconnects", Proceedings from 11th Symposium on High Performance Interconnects, Aug. 20, 2003, pp. 21-29.

Tanenbaum A S ED, "Chapter 4", Computer Networks, Jan. 1, 1996, Prentice-Hall International, London, pp. 310-317.

V. Kashyap; "IP Over InfiniBand (IPoIB) Architecture", The Internet Society; 2006; 22 pages.

University of Tennessee; "Message Passing Interface Forum"; Sep. 4, 2009, 647 pages.

International Search Report and Written Opinion in Related International Patent Application No. PCT/US13/40508, mailed Jul. 29, 2013; 14 pages.

Non-Final Office Action in related U.S. Appl. No. 13/470,847, mailed on Sep. 6, 2013; 22 pages.

International Search Report & Written Opinion in related international patent application No. PCT/US13/44278, mailed on Sep. 19, 2013; 11 pages.

Loi, et al., "A Low-overhead Fault Tolerance Scheme for TSV-based 3D Network on Chip Links", IEEE International Conference on Computer-Aided Design, Nov. 10, 2008, New Jersey, USA; 5 pages.

International Search Report & Written Opinion in related international patent application No. PCT/US13/44902, mailed on Oct. 14, 2013; 11 pages.

Notice of Allowance in related U.S. Appl. No. 13/470,847, mailed on Apr. 14, 2014; 19 pages.

Non-Final Office Action in related U.S. Appl. No. 13/589,463, mailed on May 9, 2014; 12 pages.

\* cited by examiner

MEMORY SWITCH FOR INTERCONNECTING SERVER NODES

RELATED APPLICATIONS

This application is related to U.S. application Ser. No. 13/470,847, filed May 14, 2012 and U.S. application Ser. No. 13/526,973, filed Jun. 19, 2012, the content of each of which is incorporated herein by reference in its entirety.

FIELD OF THE INVENTION

The present invention relates generally to a network switch architecture, and more specifically, to a system and method for interconnecting server nodes

BACKGROUND

Data centers are generally centralized facilities that provide Internet and/or intranet services supporting businesses and organizations. A typical data center can house various types of electronic equipment, such as computers, domain name system (DNS) servers, network switches, routers, and data storage devices. A typical data center can have thousands of interconnected servers communicating with each other and/or with external devices via a switching architecture comprising the electronic equipment. Conventional data centers can also be configured for virtualization, permitting servers or the like to share network interface cards (NICs), hard disk drives, or other hardware. A complex switch fabric can facilitate communications between the servers.

BRIEF SUMMARY OF EMBODIMENTS

In one aspect, there is provided a data switching device. The data switching device comprises a plurality of input ports, a plurality of output ports, a plurality of first conductive connectors, a plurality of second conductive connectors, a plurality of crosspoint regions, and a memory device at each crosspoint region. The plurality of first conductive connectors are in communication with the plurality of input ports. The plurality of second conductive connectors are in communication with the plurality of output ports. Each crosspoint region includes at least one first conductive connector and at least one second conductive connector. The memory device is coupled between the at least one first conductive connector and the at least one second conductive connector for exchanging data between the input ports and the output ports.

In another aspect, there is provided an interconnect device. The interconnect device comprises a memory switch and a memory switch controller. The memory switch comprises a plurality of input ports and a plurality of output ports. The input ports and the output ports are constructed and arranged into a plurality of I/O port pairs. Each I/O port pair includes an input port and an output port. The memory switch further comprises a memory device coupled to each I/O port pair. The memory switch controller transfers data between an I/O port pair and a memory device coupled to the I/O port pair.

In another aspect, there is provided an aggregation system. The interconnect device includes a switch device, a data output processor, and a controller. The switch device is constructed and arranged to include an array of conductive connectors and a memory device at a region of overlap of a first conductive connector in communication with an input port and a second conductive connector in communication with an output port. The memory device exchanges data between the input port and the output port. The data output processor receives the data from the output port and outputs the data to a network. The controller manages a delivery of the data from the input port to the data output processor.

In another aspect, there is provided a computer-implemented method for transferring data between electronic devices. The method comprises writing data from a source electronic device to a memory device; creating a record of the data written to the memory device; reading the record to determine a location of the data at the memory device; and outputting the data from the location of the memory device to a destination electronic device.

In another aspect, there is provided a computer program product comprising a computer readable storage medium having computer readable program code embodied therewith. The computer readable program code comprises computer readable program code configured to write data from a source electronic device to a memory device; computer readable program code configured to create a record of the data written to the memory device; computer readable program code configured to read the record to determine a location of the data at the memory device; and computer readable program code configured to output the data from the location of the memory device to a destination electronic device.

BRIEF DESCRIPTION OF THE SEVERAL VIEWS OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

In the following description, specific details are set forth although it should be appreciated by one of ordinary skill that the systems and methods can be practiced without at least some of the details. In some instances, known features or processes are not described in detail so as not to obscure the present invention.

Figure 1:
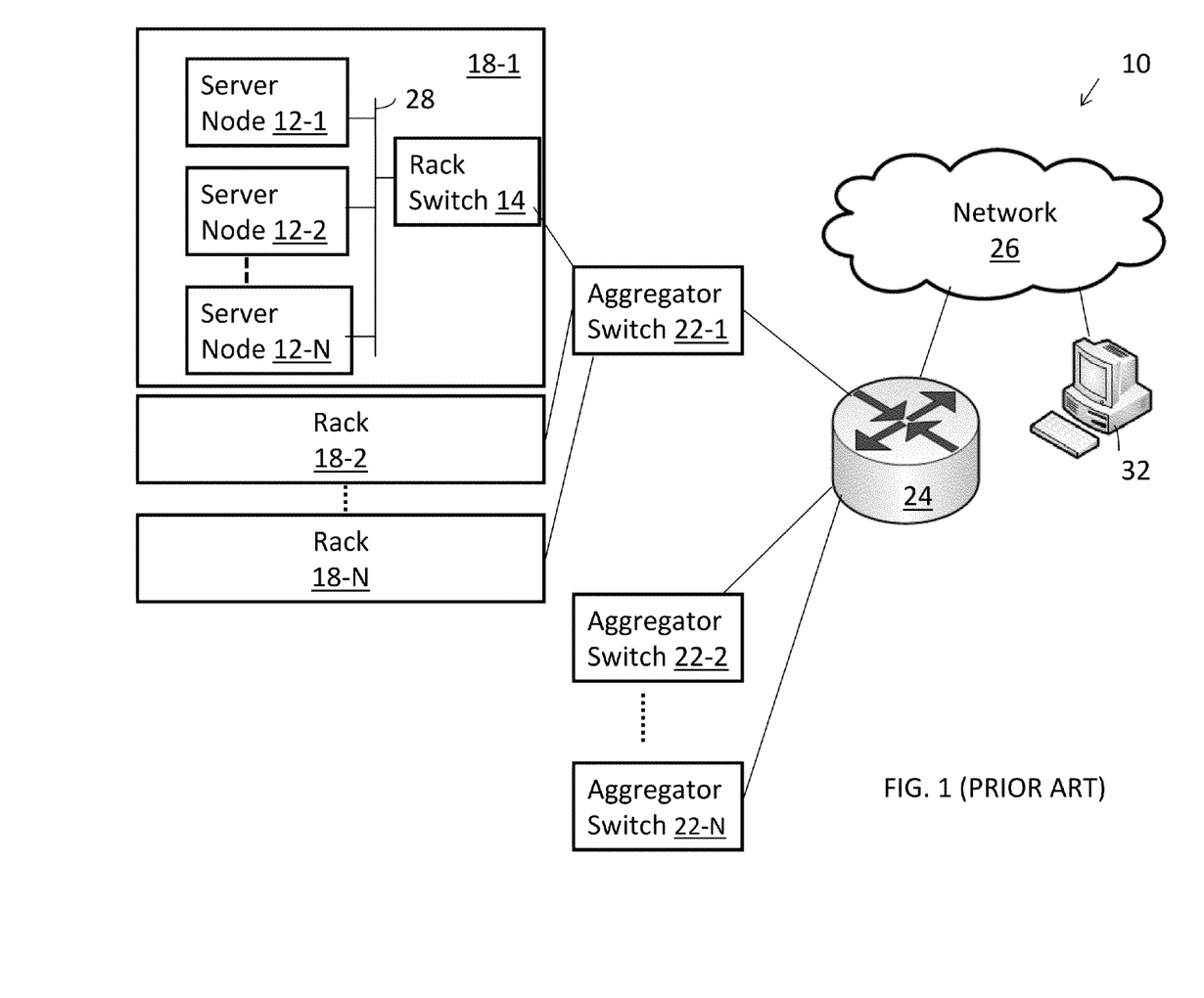
FIG. 1 is a block diagram of a conventional data center network hierarchy.

FIG. 1 is a block diagram of a conventional data center network hierarchy 10. The data center network hierarchy 10 includes a plurality of server nodes 12-1 to 12-N (N is an integer greater than 1), microservers, single socket servers (SSS), or other processor-based hardware device in communication with a rack switch 14 via a local area network (LAN) such as an Ethernet LAN or related data network in a rack 18-1. The rack 18-1 can be configured as part of a cluster with one or more other racks 18-2, 18-N (N is an integer greater than 1) in the data center network hierarchy 10. Each cluster can include an aggregation switch 22-1, 22-2, 22-N (N is an integer greater than 1), which is connected to a core router 24 via a network connection, for example, an Ethernet connection. A user computer 32, for example, a laptop, smartphone, or other electronic device, can exchange data with the server nodes 12 at high speeds via a network 26, for example, an IP network, the internet, and so on. A continuing desire exists to reduce to size, expense, and power requirements associated with such data center configurations.

Figure 2:
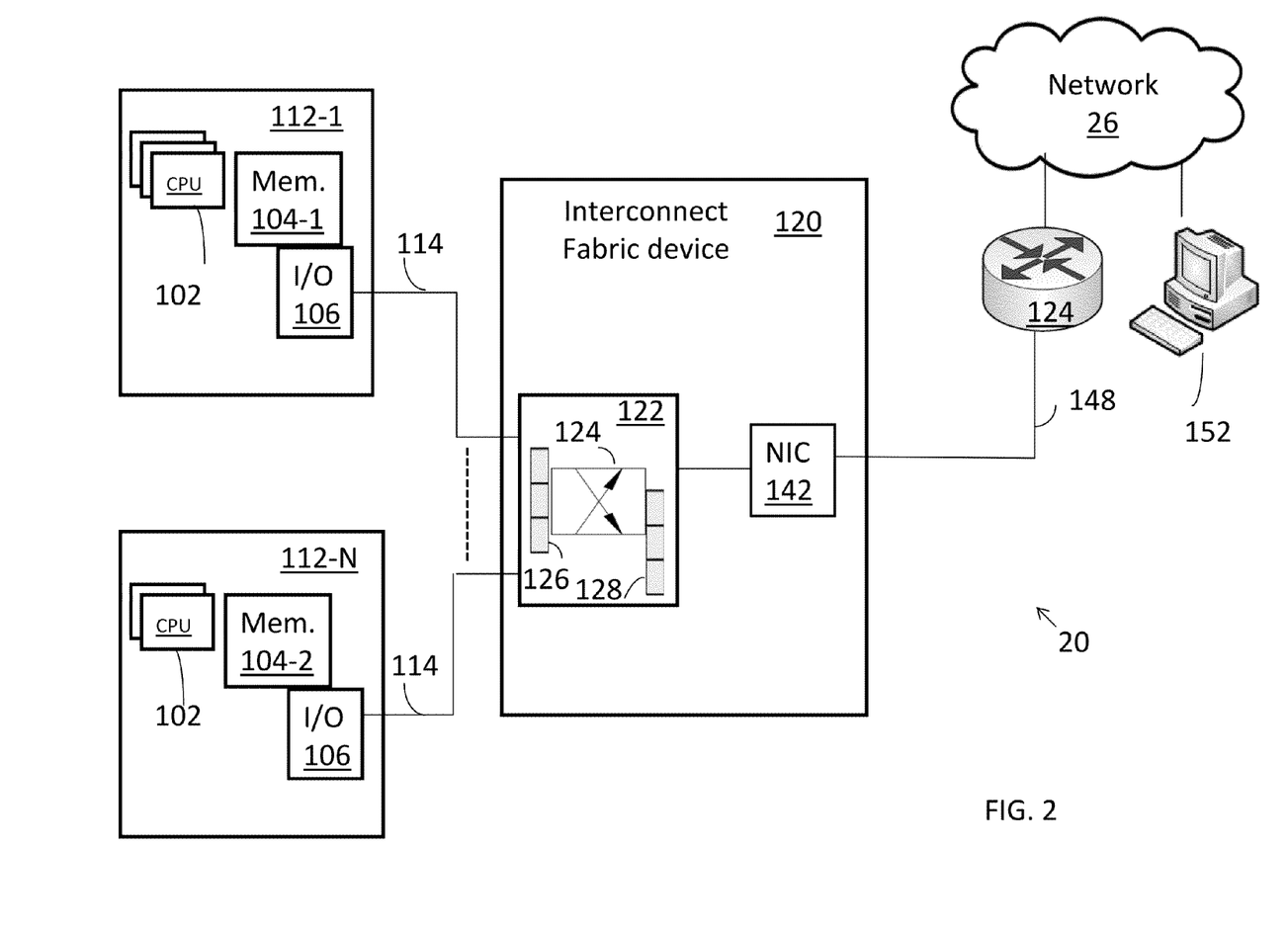
FIG. 2 is a block diagram of a data center including a plurality of server nodes coupled to an interconnect fabric device.

FIG. 2 is a block diagram of a data center 20 including a plurality of server nodes 112_1 through 112_N (N is an integer greater than 1) coupled to a conventional interconnect device 120. The interconnect device 120 can consolidate a number of aggregation switches and rack switches under a single device.

The server nodes 112_1 through 112_N (generally, 112) can be single socket servers or other low-power devices. Each server node 112 can include a processor 102. The processor 102 can include one or more microprocessors, central processing units (CPUs), graphics processing units (GPUs), digital signal processors (DSPs), application-specific integrated circuits (ASICs), memory controllers, multi-core processors, or other types of data processing devices, or portions and combinations of these and other devices.

The server nodes 112 can include a local memory 104 and an I/O logic 106. The local memory 104 can be a non-volatile or volatile memory, for example, DRAM or static RAM (SRAM). The I/O logic 106 can be configured to include a southbridge or related I/O controller for managing data transfers between the server node 112 and the interconnect device 120, and for performing other computer I/O functions. The I/O logic 106 can include an Ethernet device driver, PCIe connector, or other network connector for establishing a communication path 114 with the interconnect device 120.

The interconnect device 120 includes a multi-port switch fabric 122 that provides a plurality of data interconnections between the server nodes 112. In particular, the switch fabric 122 includes a plurality of input ports, a plurality of output ports and a crossbar 124 that can route variable or fixed length data packets, cells, and the like between the input and output ports, facilitating communication via one or more communication paths 114 between the server nodes 112 and/or shared devices such as a physical NIC 142. The interconnect device 120 via the NIC 142 can communicate with a user computer 152 via a router 124 coupled between a network 26 and a network bus (not shown), for example, an Ethernet bus, a PCIe bus, or other peripheral bus known to those of ordinary skill in the art.

The crossbar 124 is constructed and arranged to include a plurality of conductive rows and columns that intersect each other so that data can be exchanged between rows and columns. The input ports can place data on the rows, and the output ports can receive data from the columns. Several input ports can each place data on a corresponding row.

A disadvantage with crossbar switches is that the crossbar 124 exposes the switch fabric 122 to congestion, for example, when data transmitted on different crossbar rows by two or more input ports compete for the same crossbar column to which a common output port is coupled. Also, port count scaling is limited because additional ports require a larger crossbar, resulting in a larger footprint, greater power requirements, and complex arbitration systems to manage the traffic flow through the crossbar.

To reduce the effects of congestion, buffers can be provided at the crossbar 124. For example, an input buffer 126 can be provided at that input ports to temporarily store data received from the server nodes 112 until the crossbar 124 can deliver the data to an available output port. An output buffer 128 can be provided at the output ports for temporarily storing data received from one or more input ports until the desired output port is available for receiving data for transmission to a network bus 140, for example, an Ethernet bus.

However, this can lead to other problems such as head-of-line (HOL) blocking, where a data packet at the head of the buffer queue waits for available space, preventing data packets behind this packet in this queue from being forwarded to their destinations. A related issue is the inefficient use of bandwidth between the server nodes 112 and the interconnect device 120 arising from overrun and/or underrun conditions. For example, data can be "pushed" from a server node 112 to the interconnect device 120 regardless of the state of the input buffer 126. The data is dropped if the input buffer 126 is saturated. In particular, large port configurations often result in the input and output buffers 126, 128 unable to keep up with the receipt of data from multiple input ports, resulting in undesirable latency, jitter, or packet loss.

Flow control and arbitration techniques can be implemented for mitigating network congestion at the data center 20. However, such techniques are typically complex and expensive to implement, and often have drawbacks. For example, Ethernet-based retransmissions consume valuable bandwidth at the switch. Some flow control techniques can be applied to an upstream device, requesting it to stop passing packets to the switch fabric 122. Complex scheduling algorithms and bus arbitration techniques are often implemented to manage data traffic through the crossbar 124 in order to further reduce congestion-related issues. Although such techniques are effective at reducing buffer overflow, they do not alleviate network congestion completely. Another approach is to couple the interconnect device 120 to an external or "out-of-box" memory device for queuing packets during operation. However, this approach requires additional off-chip pins at the interconnect device 120 and silicon-occupying "copper" connections to the external memory device, resulting in additional footprint constraints and scaling limitations. Additional I/O ports at the switch fabric 122 also increases the risk of contention for shared resources in addition to complexities arising from managing traffic flows through the crossbar 124.

The present inventive concepts provide a non-arbitration interconnect fabric that includes a plurality of input ports and output ports for exchanging data with a plurality of electronic devices such as server nodes and the like. The interconnect fabric can include a plurality of conductive connectors. A set of first conductive connectors can each be coupled to an input port. A set of second conductive connectors can each be coupled to an output port. A memory is coupled between a first conductive connector and a second conductive connector. The memory is constructed and arranged to be writable by one program, agent, and the like, and readable by another program, agent, and the like. Accordingly, the first and second conductive connectors can be constructed and arranged as an array, wherein an intersection at each rows and corresponding column of the array includes a conductive crosspoint region at which a memory is located. The memories preferably include through silicon via (TSV) memory coupled between each row and column pair. Thus, each input port communicates with a corresponding output port via a memory. For example, an output port can retrieve data from a TSV memory to which an input port has provided data.

During a data transfer operation, data is written from a source device to a memory coupled at a crosspoint region in the interconnect fabric between an input port receiving the data from the source device and an output port for transmitting the data to a destination device. The data can be subsequently retrieved from the memory by the output port. Collectively, the memories provide memory bandwidth to permit the interconnect fabric to concurrently perform large numbers of data transfer operations for exchanging data with the memories at all crosspoints of the interconnect fabric. The introduction of a memory at a crosspoint region permits a data transfer operation to occur without arbitration occurring between input ports and corresponding output ports. Accordingly, either the input ports or the output ports of the interconnect fabric can receive and process data regardless of the state of the other of the input ports and the output ports. HOL blocking and other congestion-related problems can be avoided because the memories replace conventional queues, so data packets cannot be stalled at the head of the queue. In configurations where a memory output queue is nevertheless provided, if an output port has a saturated or near-saturated memory output queue, congested-related issues can be reduced or eliminated because data destined for the output port can be stored at the TSV memory until the output port is available to retrieve the data. Latency can be reduced because the TSV memory in accordance with embodiments of the present inventive concepts permits data buffering to occur closer to the point of transmission, i.e., the memories coupled to the output ports.

Figure 3:
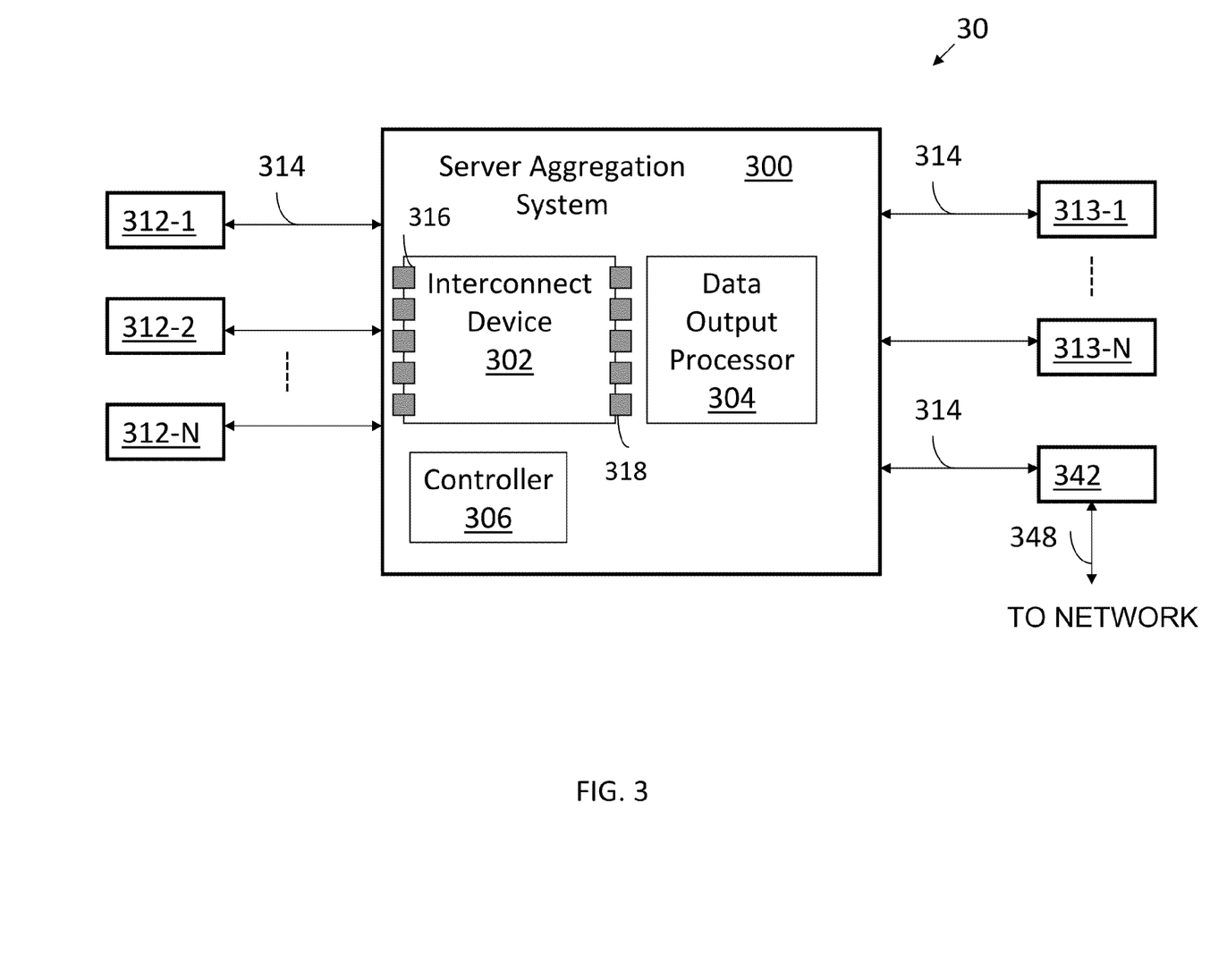
FIG. 3 is a block diagram of a computing infrastructure including a plurality of server nodes in communication with an aggregation system, in accordance with an embodiment.

FIG. 3 is a block diagram of a computing infrastructure 30 including a plurality of server nodes 312-1 through 312-N (generally, 312) and 313-1 through 313-N (generally, 313) in communication with an aggregation system 300 constructed and arranged to include a interconnect device 302, in accordance with an embodiment. The computing infrastructure 30 can include a large-scale data center, cloud computing environment, and the like.

The server nodes 312, 313 can include single socket servers, microservers, or other micro-processor devices known to those of ordinary skill in the art. The server nodes 312, 313 can communicate with the aggregation system 300 over data paths 314 via a PCIe bus or other network connector. The server nodes 312, 313 can be similar to the server nodes 112 described with reference to FIG. 2, so details are not repeated for brevity. Some or all of the server nodes 312, 313 can include a hypervisor, virtual machines, guest operating systems, and/or related components required for virtualization. The server nodes 312, 313 can therefore be configured to require less memory, processing power, and energy consumption than the server nodes 112 of FIG. 2, because the server nodes 312, 313 can share hardware resources and for other reasons described herein.

The server nodes 312, 313 can be formed on a different chip or other hardware device than the aggregation system 300, where the aggregation system 300 can include a plurality of package pins or related interfaces and metal interconnects providing the data paths 314 with the server nodes 312, 313 in accordance with PCIe or other communication protocol. Some or all of the aggregation system 300 can be configured at a chip-level, for example, on-die. In another embodiment, the aggregation system 300 and the server nodes 312, 313 are co-located at a same chip or other physical device.

The aggregation system 300 includes a interconnect device 302, an I/O processor 304, and a controller 306. In an embodiment, the aggregation system 300 is configured for virtualization, for example, receiving data processed at virtual machines (VMs) at the server nodes 312, 313.

The interconnect device 302 includes a plurality of input ports 316 for receiving data, more specifically, cells, frames, packets, or other units of data arriving via one or more lanes of a data path 314 from one or more server nodes 312, 313, or from a remote device via a NIC 342. Each input port 316 can provide data to an output port 318 via a crosspoint region (not shown) via conductive connectors between the input port 316 and the output port 318. A conductive connector extending from an input port 316 and a conductive connector extending from an output port do not require a physical point of intersection, but can overlap each other at the crosspoint region without physical contact. Instead of two conductive connectors intersecting at a physical point for exchanging signals therebetween, a memory device (not shown) can be provided at each crosspoint region. Here, a conductive connector extending from an input port 316 and a conductive connector extending from an output port can each be coupled to the memory. The memory, referred to as a memory, preferably includes through silicon via (TSV) memory. In an embodiment, one input port and one output port has access to an individual memory. In another embodiment, multiple input ports 316 and/or multiple output ports 318 have access to a memory constructed and arranged to process data received from the input ports 316 for receipt by the output ports 318. During a data transfer operation, data stored at the memory by an input port 316 can be received an output port 318 according to destination information corresponding to the data. The output port 318 in turn can provide the data to a target server node 312, 313 or to a remote device via a physical NIC 342 and an uplink port link 348.

The I/O processor 304 processes data transferred between the interconnect device 302 and the server nodes 312, 313 and/or remote computing devices accessible via the physical NIC 342. The I/O processor 304 can examine incoming data packets directed to a server node 312, 313 via the interconnect device 302 and the like and route them to their destination, or output data packets to a remote device, for example, via the NIC 342 based on destination address information or other identification fields. The I/O processor 304 can include a packet processor that examines data packets to determine whether they should be filtered or forwarded.

The controller 306 manages a switching control plane (not shown) for data delivery between the server nodes 312 and the aggregation system 300 by operating network routing protocols, participating in the forwarding of data packets, frames, cells, and the like that are received by the aggregation system 300. The controller 306 can implement and manage virtual network interface cards (vNICs) (not shown) which communicates with the server nodes 312, 313 for transferring data between the server nodes 312, 313. The controller 306 can maintain local tables that include classification, forwarding, or routing information, or profiles, rules, or policies regarding data received by the interconnect device 300.

Figure 4:
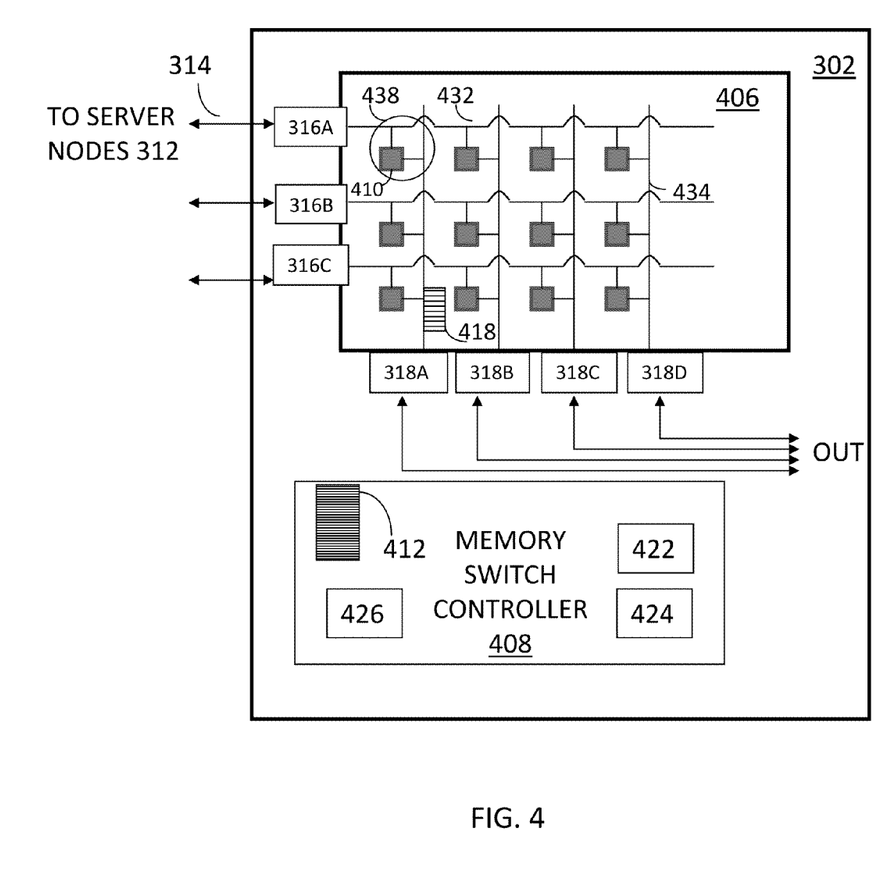
FIG. 4 is a block diagram of components of an interconnect device, in accordance with an embodiment.

FIG. 4 is a block diagram of the interconnect device 302 of FIG. 3, in accordance with an embodiment.

The interconnect device 302 includes a multi-port switch device 406 and a memory switch controller 408. The switch device 406 can be configured as part of an interposer or 3D integrated circuit (IC) configuration for connecting to the server nodes 312, 313. The switch device 406 receives data via a plurality of input ports 316A-316D (generally, 316) and outputs data to a destination via an output port 318A-318D (generally, 318). The input ports 316 and output ports 318 can be unidirectional or bidirectional, i.e., exchange in the input and/or output of data. Accordingly, the input ports 316 can also output data, and the output ports 318 can also input data. One or more server nodes or other electronic devices share a same input port 316 or a same output port 318.

The switch device 406 is constructed and arranged to connect the input ports 316 and the output ports 318 to a switch fabric comprising a plurality of first conductive connectors 432 and a plurality of second conductive connectors 434. The first conductive connectors 432, also referred to as horizontal connectors or row connectors, can each be in communication with one or more input ports 316. The second conductive connectors 434, also referred to as vertical connectors or column connectors, can each be in communication with one or more output ports 318. The first conductive connectors 432 and the second conductive connectors 434 can be constructed and arranged as an N×M array, wherein N and M are each an integer greater than 0. In an embodiment, N and M are different integers. In another embodiment, N and M are the same integer.

In an embodiment, the switch device 406 includes a plurality of crosspoint regions 438. At each crosspoint region 438, a memory 410 is coupled to one or more first conductive connectors 432 and one or more second conductive connectors 434. The memories 410 can include one or more TSV DRAMs, on die memories, or other high-bandwidth memories. The memories 410 can be independent of each other, for example, each having separate memory locations and the like. In an embodiment, little or no synchronization is required when providing data to different memories 410 or retrieving data from the memories 410.

Each memory 410 can be in communication with one or more input ports and one or more output ports. For example, as shown in FIG. 4, a crosspoint region 438 includes a memory coupled between a first conductive connector 432 in communication with an input port 316A and a second conductive connector 434 in communication with an output port 318A. In this example, data can be provided to the memory 410 from the input port 316A and retrieved from the memory 410 for output via the output port 318A to its destination. By providing a memory 410 at each crosspoint, each output port 318 is provided with a predetermined amount of memory, allowing for a more predictable output performance. The memory 410 can be constructed and arranged to process data from one or more virtual machines at a server node 312, 313. Multiple virtual machines can share a same input port 316, which can provide received data to different locations of the memory 410, each location storing data from a different virtual machine.

The memory switch controller 408 coordinates the transfer of data at the switch device 406, for example, between one or more server nodes 312, 313 and/or external electronic devices, for example, a remote computer via a NIC 342. The memory switch controller 408 can include a buffer descriptor manager 412, a write controller 422, a read controller 424, and a header processing module 426.

The buffer descriptor manager 412 can include one or more buffers or the like for allocating descriptors pointing to free blocks of memory at the memories 410 of the switch device 406. The buffer descriptor manager 412 can maintain multiple memory block descriptors for creating a linked-list of data blocks at the switch device 406. The buffer descriptor manager 412 manages the allocation of buffers at the memories 410, including those buffers returned to the memory switch controller 408 after use.

The write controller 422 writes data from a local memory at a server node 312, 313 into a memory 410. During operation, a server node 312, 313, for example, a guest virtual machine (VM) at the server node, can post new data to its local memory, and notify the aggregation system 300 that a new descriptor (distinguished from the descriptors provided by the buffer descriptor manager 412) is in the local memory and ready to be fetched and processed. The write controller 422 can read the descriptor pointing to the local memory of the server node 312, 313 where the posted data is located, and retrieve the data from the local memory according to the descriptor. The write controller 422 can request available memory locations at one or more memories 410 of the switch device 406 from the buffer descriptor manager 412. The write controller 422 can be configured to write the data to the switch device 406 in response to the switch device 406 generating an indicator that it is ready to receive the data, providing a level of link congestion management since the switch device 406 reads and/or writes data subject to the availability of the memory 410 to receive and store the data. The write controller 422 can divide data packets, frames, and the like into smaller units in accordance with the configuration of the memory 410, for example, to accommodate a memory block size.

The header processing module 426 can generate a record from a data packet, frame, or other unit of data received by the interconnect device 302, and post it to a memory output queue 418. In an embodiment, a memory output queue 418 can correspond to an output port 318, and can be provided at each column connector 434 for collecting record data received by the input ports 316 and directed to destinations via the selected output port 318. The record can include metadata provided by the source server nodes 312, 313, which can relate to data destination information, and can be used to designate a memory output queue 418 for receiving the record. The record can include routing hints, for example, related to a state for maintaining legacy protocol transparency. The designated output queue 418 preferably corresponds to the output port 318 identified for outputting the payload corresponding to a received record to its destination, for example, a target server node 312, 313 or an external device via a NIC 342.

The read controller 424 can read a descriptor ring and the like at a target server node 313, fetch the data stored at the memory 410, and provide the data via an output port 318 to the available data locations identified by the descriptor at the target server node 313. Alternatively, the read controller 424 can provide the data to the data output processor 304, which in turn communicates with the NIC 342 for remote destinations via the Ethernet uplink 348. The read controller 424 can use pointer and/or other address information in the memory record stored in the memory output queue 418 to determine the location of the data at the switch device 406 from which to retrieve the data. The read controller 424 can be activated to move data to the target server node 313 by the arrival of the data to a memory 410 and/or the arrival of a record corresponding to the data at the memory output queue 418.

Figure 5:
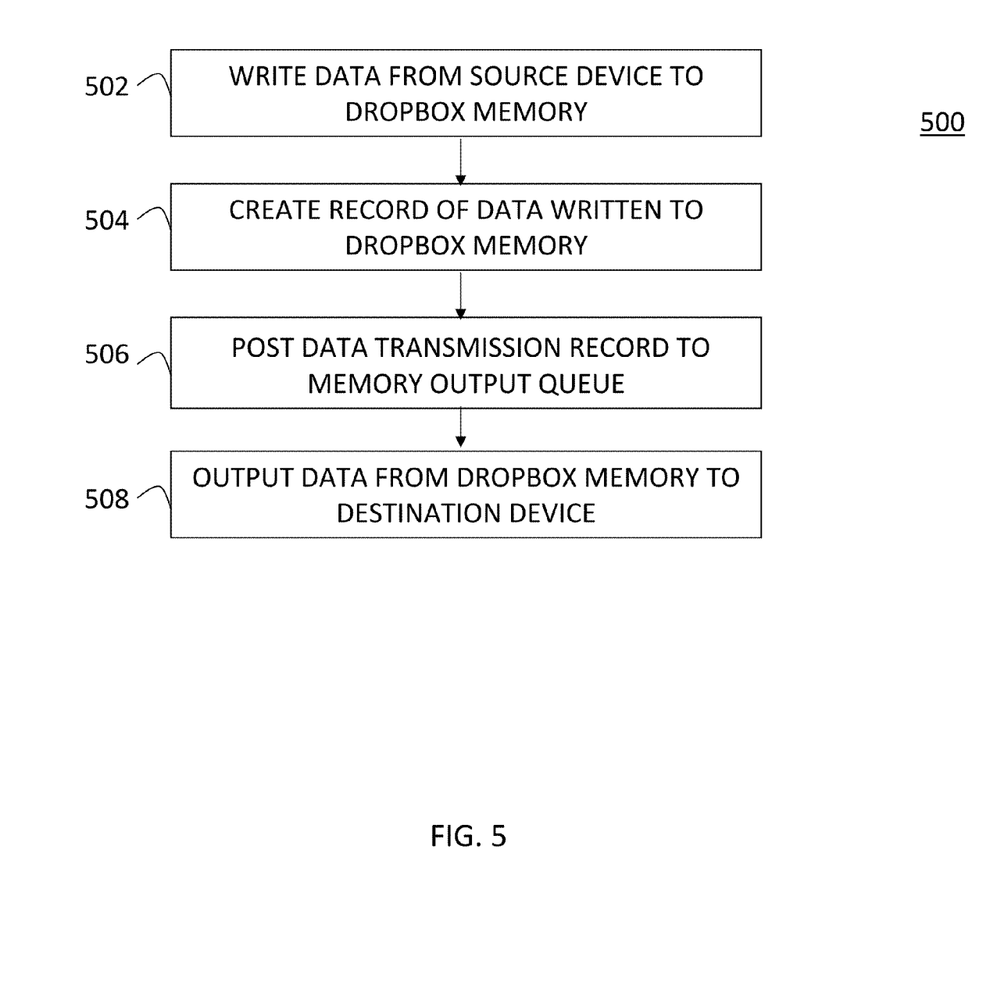
FIG. 5 is a flow diagram of a method for transmitting data between electronic devices in communication with an aggregation system, in accordance with an embodiment.

FIG. 5 is a flow diagram of a method 500 for transmitting data between electronic devices in communication with an aggregation system, in accordance with an embodiment. In describing the method 500, reference is also made to FIGS. 3 and 4. Some or all of the method 500 can be performed at the aggregation system 300. In describing the method 500, server node 312-1 shown in FIG. 3 can be referred to as a source server node, and server node 313-1 shown in FIG. 3 can be referred to as a target server node. Although the server nodes 312-1, 313-1 are shown and described, remote electronic devices in communication with the aggregation system 300 via a physical NIC and the like can equally apply.

Prior to the method 500, data can be provided by a CPU or other processor at the source server node 312-1 to a local memory of the source server node 312-1. In an embodiment, one or more guest virtual machines at the source server node 312-1 can post new data at the local memory.

At block 502, the data is written from the local memory of the source server node 312-1 to a memory 410 located at a crosspoint region 438 between an input port 316A from which the data is received and an output port 318A where the data is to be output to its destination. The memory 410 can be determined according to the source server node 312-1 from which in part to the first conductive conductor 432 to which the input port 316 corresponding to the source server node 312-1 is associated. Alternatively, or in addition, the memory 410 can be determined by the destination of the data.

The source server node 312-1 can serve as a trusted source, providing data including informed routing decisions to the interconnect device 302. Alternatively, the source server node 312-1 informs the interconnect device 302 of its intended destination. The interconnect device 302 relies on this data to determine where to route the data. Alternatively, the source server node 312-1 can instruct the interconnect device 302 routes the data to an intended destination, and the interconnect device verifies this information, for example, confirming that the routing data is correct. The memory 410 can be determined according to one of these foregoing embodiments.

For example, source server node 312-1 can provide one or more data packets to the memory 410, which extends along a second conductive connector 434 coupled to a destination server 318B. The source server node 312-1 can generate a notification that is sent to the aggregation system 300 announcing the data availability. The server node 312-1 can include a ring buffer that includes a set of descriptors that point to data in the local memory, which can be accessed by the write controller 422 described herein. The notification information can include a pointer to the data in the local memory of the source server node 312-1 to be moved to the aggregation system 300. The memory switch controller 408 can manage and control the reading of the descriptor, retrieval of the data corresponding to the descriptor, and the writing of the data to the crosspoint memory 410.

The data can be output to the memory 410 as fixed length or variable length packets, frames, cells, or related electronic package of data. The data can be provided by applying time-division-multiplexing (TDM) techniques and the like. The data can be fragmented, linked, or otherwise divided by the interconnect device 302 into smaller units in order to be written into one or more available memory locations.

At block 504, a record, also referred to as a data transmission record, can be created of the data stored at the memory 410. The record can include metadata that includes a destination address and the like for the data, a pointer to the memory location of the data, the size of the stored data, routing data, states for making legacy protocol transparency, e.g., looks like Ethernet even though it is not, and/or related information. The destination address information can include physical, logical, and/or virtual address information.

At block 506, the data transmission record is output to a memory output queue 418 in communication with a second conductive connector 434, e.g., at a column of the switch array. Thus, each output port 318 can have a corresponding memory output queue 418 that processes record data from one or more input ports 316. The memory output queue 418 can be in communication with each memory 410 connected to the same column connector 434 as the memory output queue 418. The memory output queue 418 receiving the record data can be determined by the metadata in the record, more specifically, the source of the data, destination information or related identifier provided in the header of the data packet, and/or the descriptor data provided from the source server node 312-1 to the input port 316 of the interconnect device 302.

At block 508, the data is fetched from the memory 410 and written to a destination device. In one embodiment, the destination device is a target server node 313-1. In another embodiment, the data is output to a destination device external to the aggregation system 300, for example, a remote device in communication with the aggregation system 300 via the NIC 342. Prior to outputting data to the target server node 313-1, the read controller 424 can read a descriptor ring at the target server node 313-1 to determine available local memory for receiving the data. The output memory queue 418 can be read to determine from the record the location of the data packet, more specifically, the memory 410 or memory location at the memory 410, from which the record data is extracted at the switch device 406. The data can subsequently be retrieved from the identified memory 410. The output memory queue 418 can be read to determine from the data record the location of the data, for example, a memory address at the memory 410. The location of the data at the memory 410 can therefore be provided so that that the data can be transmitted to a destination via the output port coupled to this memory 410.

Figure 6:
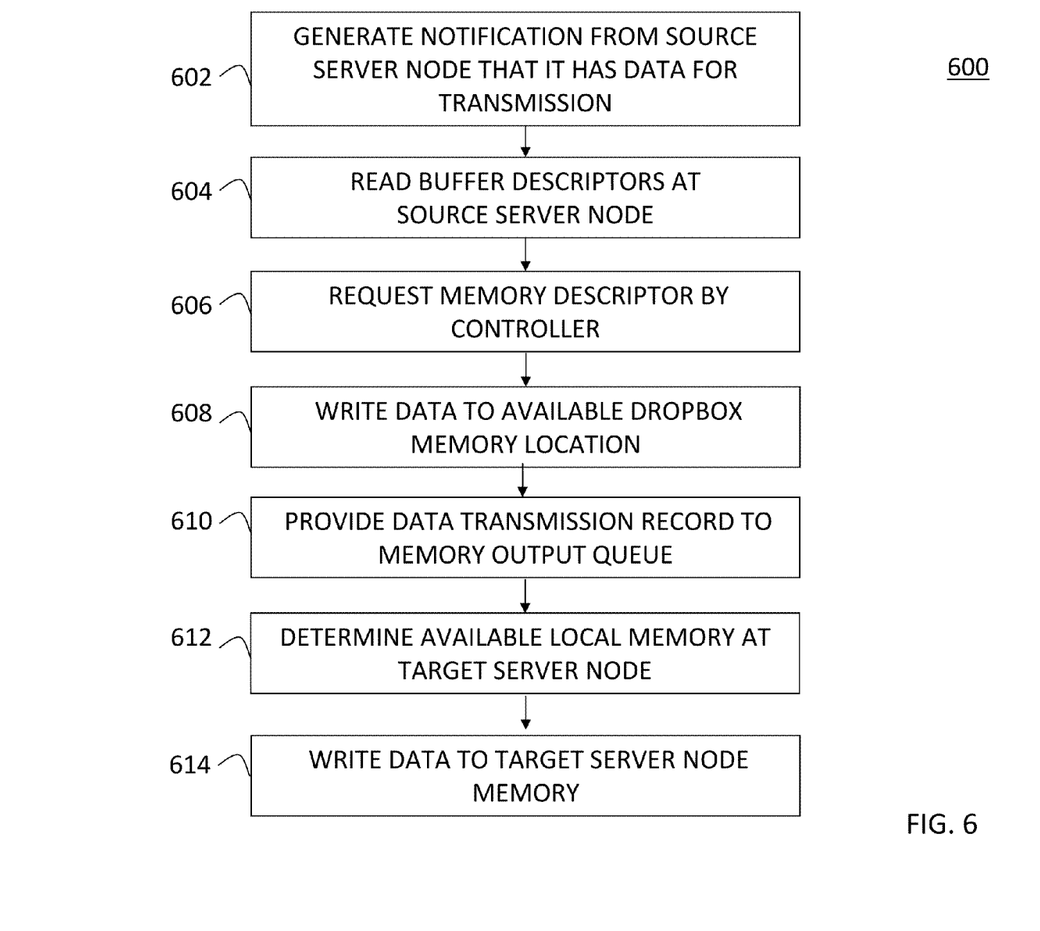
FIG. 6 is a flow diagram of a method of electronic communication between two server nodes in communication with a memory switch, in accordance with an embodiment.

FIG. 6 is a flow diagram of a method 600 for electronic communication between two server nodes 312-1, 313-1 in communication with a interconnect device 302, in accordance with an embodiment. In describing the method 600, reference is also made to FIGS. 3 and 4. Some or all of the method 600 can be performed at the aggregation system 300. In describing the method 600, a server node 312-1 can be referred to as a source server node, and 313-1 can be referred to as a target server node. Although the server nodes 312-1, 313-1 are shown and described, remote electronic devices in communication with the aggregation system 300 via the physical NIC 342 and the like can equally apply.

At block 602, the source server node 312-1 generates a notification that it has data for transmission to a destination, for example, the target server node 313-1 or a remote electronic device. The source server node 312-1 can include a ring buffer and the like that includes a set of descriptors pointing to the location of data in the source server node local memory. The notification can include a mailbox event or other indicator to the aggregation system 300 indicating that the data is available for transmission.

At block 604, the aggregation system 300 can read the ring buffer descriptors to determine the manner in which to retrieve and process the corresponding data. In the event that the data cannot be stored or processed by the aggregation system 300, the aggregation system 300 can determine if there are available buffers at a memory 410 identified for receiving the data. If there are no available buffers, then the aggregation system 300 can wait until a designated memory 410 identified for receiving the data is available before receiving data from the source server node 312-1, rather than dropping or discarding the data. This feature provides a level of link congestion management, since the interconnect device 302 reads and/or writes data subject to the availability of the memory 410 to receive and store the data. In another embodiment, the memory 410, although able to receive and store the data, may not be able to provide the data to the corresponding output port 318 in communication with the memory 410, for example, because the memory output queue 418 is saturated or the output port 318 is unavailable to receive the data. Here, the data can be stored at the memory 410 until the output port 318 is available to receive the data from the memory 410.

At block 606, the memory switch controller 408 can request one or more memory descriptors indicating available memories at a memory 410 at the crosspoint region 438 between the input port 316A in communication with the source server node 312-A and the output port 318A corresponding to the target server node 313-1. The write controller 422 can send a request to the buffer descriptor manager 412 for an available memory descriptor. Memory descriptors can be requested for one or more the multiple server nodes or other source devices so that data from the different source devices can be allocated to, and retrieved from, different locations of the shared memory 410.

At block 608, the data in the local memory of the source server node 312 can be retrieved and written by the write controller 422 to the location of the memory 410 allocated by the buffer descriptor manager 412.

At block 610, a data transmission record can be generated and provided to a memory output queue 418. The record can include metadata or other information related to a destination address and the like for the data, a pointer to the memory location of the data, the size of the stored data, routing data, and/or related information. The record can include state information for making legacy protocol transparent, for example, information that permits the data to appear as though it is part of an Ethernet packet. The record can be posted at the memory output queue 418 in communication with a column connector 434 corresponding to the target server node 313-1.

At block 612, the read controller 424 can read a descriptor ring or the like at the target server node 313-1 to determine available memory locations at the local memory of the target server node 313-1 has available space in its local memory 104 to receive the data.

At block 614, the data is provided from the memory 410 to the source server node 313-1 according to the posted data transmission information record and provided by the read controller 424 to the destination device. The output memory queue 418 can be read to determine from the record corresponding to the data the location of the data, for example, a memory address, at the memory 410 from where to retrieve the data. In one embodiment, the data is output to a target server node 313-1. Here, the CPU of the target server node 313-1 can post a receive descriptor pointing to free buffers at the memory. The CPU can notify a vNIC (not shown) and/or the data output processor 304 that there are available receive buffers. The vNIC and/or the data output processor 304 can fetch the data to move to the target server node 313-1. In another embodiment, the data is output to a destination device external to the aggregation system 300, for example, a remote device in communication with the aggregation system 300 via the NIC 342.

Figure 7:
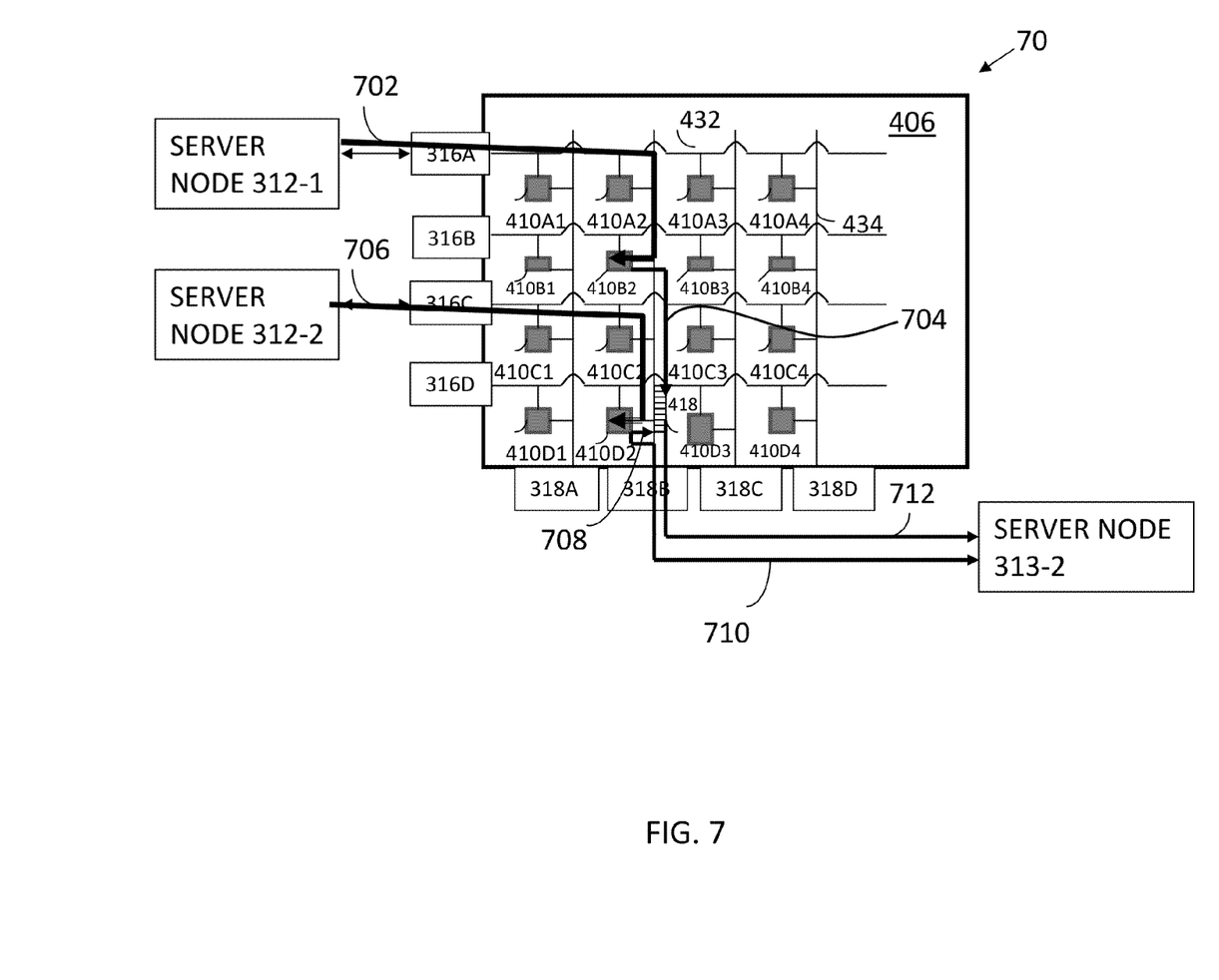
FIG. 7 is a block diagram of a computing infrastructure illustrating data flow paths between a plurality of server nodes and an aggregation system, in accordance with an embodiment.

FIG. 7 is a block diagram of a computing infrastructure 70 illustrating data flow paths between a plurality of server nodes 312-1, 312-2, 313-1 and a switch device 406, in accordance with an embodiment. A plurality of memories 410A1-A4, 410B1-B4, 410C1-C4, 410D1-D4 are coupled between the first conductive connectors 432 and the second conductive connectors 434, which in turn are coupled to the input ports 316 and the output ports 318, respectively.

At data flow path 702, data written from the local memory of a first source server node 312-1 is provided to a first memory 410B2. The first memory 410B2 is in communication with a pair of ports, namely, an input port 316A and an output port 318B.

At data flow path 704, a record is taken of the data provided to the first memory 410B2, and provided to a memory output queue 418.

At data flow path 706, data written from the local memory of a second source server node 312-2 is provided to a second memory 410D2. The second memory 410D2 is coupled between an input port 316C and the output port 318B.

At data flow path 708, a record is taken of the data provided to the second memory 410D2, and provided to the memory output queue 418. Accordingly, the output port 318B can receive data from the first memory 410B2 and the second memory 410D2, and the memory output queue 418 corresponding to the output port 318B can store records corresponding to the data received from each of the import ports 316A, 316C.

At data flow path 710, the record corresponding to the data at the first memory 410B2 is processed, and the data is retrieved from the first memory 410B2 according to the record information.

At data flow path 712, the record corresponding to the data at the second memory 410D2 is processed, and the data is retrieved from the second memory 410D2 according to the record information.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been shown and described with reference to specific embodiments, it should be understood by those skilled in the art that various changes in form and detail may be made therein without departing from the spirit and scope of the invention.

What is claimed is:

1. A computer-implemented method for transferring data between electronic devices, comprising:
    writing data from a source electronic device to a memory device;
    creating a record of the data written to the memory device;
    reading the record to determine a location of the data at the memory device;
    outputting the data from the location of the memory device to a destination electronic device;
    generating a notification at the source electronic device that the source electronic device is configured for outputting the data;
    reading a buffer descriptor at the source electronic device;
    requesting a memory descriptor; and
    writing the data to the memory device in response to requesting the memory descriptor.

2. The computer-implemented method of claim 1, wherein the memory device includes a TSV memory.

3. The computer-implemented method of claim 1, further comprising:
    outputting the record to an output queue corresponding to an output port;
    reading the record in response to the record output from the output queue; and
    outputting the data from the output port to the destination memory device.

4. The computer-implemented method of claim 1, wherein the record includes at least one of the location of the data at a memory device, a source of the data, and a destination of the data.

5. The computer-implemented method of claim 1, further comprising:
    determining an available memory location at the destination electronic device; and
    writing the data from the memory device to the available memory location.

* * * * *